United States Patent
Hajiloo et al.

(10) Patent No.: US 12,115,974 B2
(45) Date of Patent: Oct. 15, 2024

(54) DATA FUSION-CENTRIC METHOD AND SYSTEM FOR VEHICLE MOTION CONTROL

(71) Applicant: GM Global Technology Operations LLC, Detroit, MI (US)

(72) Inventors: Reza Hajiloo, Waterloo (CA); Ehsan Asadi, North York (CA); Seyedeh Asal Nahidi, North York (CA); SeyedAlireza Kasaiezadeh Mahabadi, Novi, MI (US); Gianmarc Coppola, Richmond Hill (CA); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 17/824,196

(22) Filed: May 25, 2022

(65) Prior Publication Data
US 2023/0406287 A1    Dec. 21, 2023

(51) Int. Cl.
*B60W 30/02*    (2012.01)
*B60W 50/00*    (2006.01)

(52) U.S. Cl.
CPC ............ *B60W 30/02* (2013.01); *B60W 50/00* (2013.01); *B60W 2520/12* (2013.01); *B60W 2520/125* (2013.01); *B60W 2520/14* (2013.01); *B60W 2520/20* (2013.01); *B60W 2556/35* (2020.02)

(58) Field of Classification Search
CPC .. B60W 30/02; B60W 50/00; B60W 2556/35; B60W 2520/12; B60W 2520/125; B60W 2520/14; B60W 2520/20

USPC .......................................................... 701/82
See application file for complete search history.

(56) References Cited

U.S. PATENT DOCUMENTS

| | | | | |
|---|---|---|---|---|
| 5,671,143 A | * | 9/1997 | Graber | B60W 30/02 701/72 |
| 5,694,321 A | * | 12/1997 | Eckert | B60T 8/1755 701/84 |
| 5,701,248 A | * | 12/1997 | Wanke | B60W 10/184 701/72 |
| 5,710,704 A | * | 1/1998 | Graber | B60W 10/184 701/72 |
| 5,711,024 A | * | 1/1998 | Wanke | B60T 8/1755 701/72 |
| 5,732,377 A | * | 3/1998 | Eckert | B60T 8/1755 303/146 |
| 5,732,378 A | * | 3/1998 | Eckert | B60W 40/064 180/197 |

(Continued)

*Primary Examiner* — Kurt Philip Liethen
*Assistant Examiner* — John D Bailey
(74) *Attorney, Agent, or Firm* — Vivacqua Crane, PLLC (57) ABSTRACT

A method for vehicle motion control includes receiving sensor data from a plurality of sensors of a vehicle and monitoring a vehicle response of the vehicle using the sensor data. The vehicle response is represented by a plurality of vehicle-response signals. The method further includes fusing the plurality of vehicle-response signals to obtain at least one fused signal. The method further includes determining whether to activate a vehicle stability control of the vehicle based on the at least one fused signal and commanding the vehicle to activate the vehicle stability control in response to determining to activate the vehicle stability control of the vehicle based on the at least one fused signal.

16 Claims, 5 Drawing Sheets

(56) References Cited

U.S. PATENT DOCUMENTS

| | | | | |
|---|---|---|---|---|
| 5,732,379 A * | 3/1998 | Eckert | | B60T 8/1755 |
| | | | | 303/189 |
| 5,735,584 A * | 4/1998 | Eckert | | B60T 8/1755 |
| | | | | 303/140 |
| 5,774,821 A * | 6/1998 | Eckert | | B60W 40/064 |
| | | | | 701/72 |
| 5,839,799 A * | 11/1998 | Fukada | | B60T 8/17552 |
| | | | | 303/146 |
| 5,941,919 A * | 8/1999 | Pastor | | B60T 8/1755 |
| | | | | 701/72 |
| 6,456,920 B1 * | 9/2002 | Nishio | | B60T 8/17551 |
| | | | | 701/1 |
| 6,691,013 B1 * | 2/2004 | Brown | | B60W 10/08 |
| | | | | 180/197 |
| 6,795,761 B1 * | 9/2004 | Lee | | B60W 30/02 |
| | | | | 701/41 |
| 8,315,758 B2 * | 11/2012 | Takenaka | | B60T 8/172 |
| | | | | 701/72 |
| 9,542,846 B2 * | 1/2017 | Zeng | | G08G 1/09626 |
| 10,988,142 B1 * | 4/2021 | Mehrotra | | B60W 40/068 |
| 11,787,394 B2 * | 10/2023 | Hajiloo | | B60W 40/08 |
| | | | | 701/36 |
| 2004/0046448 A1 * | 3/2004 | Brown | | B60T 8/24 |
| | | | | 903/910 |
| 2005/0114072 A1 * | 5/2005 | Choi | | B60T 8/17554 |
| | | | | 702/141 |
| 2006/0020378 A1 * | 1/2006 | Salman | | B60T 8/885 |
| | | | | 701/32.9 |
| 2007/0016372 A1 * | 1/2007 | Browne | | G01C 21/005 |
| | | | | 701/469 |
| 2007/0260383 A1 * | 11/2007 | Sundaram | | B60W 50/0205 |
| | | | | 701/70 |
| 2008/0281487 A1 * | 11/2008 | Milot | | B60W 30/04 |
| | | | | 701/1 |
| 2009/0012669 A1 * | 1/2009 | Takenaka | | B60W 10/20 |
| | | | | 701/31.4 |
| 2009/0132137 A1 * | 5/2009 | Takenaka | | B60W 40/101 |
| | | | | 701/70 |
| 2009/0171526 A1 * | 7/2009 | Takenaka | | B60W 40/101 |
| | | | | 701/70 |
| 2009/0187302 A1 * | 7/2009 | Takenaka | | B62D 6/04 |
| | | | | 701/33.8 |
| 2009/0216415 A1 * | 8/2009 | Iwatsuki | | B60W 30/188 |
| | | | | 701/70 |
| 2010/0256887 A1 * | 10/2010 | Linda | | B60L 3/10 |
| | | | | 701/82 |
| 2011/0160964 A1 * | 6/2011 | Obradovich | | H04L 43/08 |
| | | | | 701/41 |
| 2012/0173091 A1 * | 7/2012 | Hukkeri | | B60W 40/068 |
| | | | | 701/50 |
| 2012/0221168 A1 * | 8/2012 | Zeng | | B60W 60/0018 |
| | | | | 701/1 |
| 2013/0144476 A1 * | 6/2013 | Pinto | | B60L 50/00 |
| | | | | 903/930 |
| 2014/0288776 A1 * | 9/2014 | Anderson | | F16F 9/064 |
| | | | | 701/37 |
| 2015/0224845 A1 * | 8/2015 | Anderson | | F03G 7/08 |
| | | | | 701/37 |
| 2015/0239442 A1 * | 8/2015 | Yamakado | | B60T 8/17555 |
| | | | | 701/70 |
| 2015/0360525 A1 * | 12/2015 | Singh | | G01K 13/08 |
| | | | | 374/141 |
| 2018/0136660 A1 * | 5/2018 | Mudalige | | B60W 30/0956 |
| 2018/0188031 A1 * | 7/2018 | Samper | | G05D 1/0272 |
| 2019/0283722 A1 * | 9/2019 | Haas | | B60T 8/17552 |
| 2020/0039315 A1 * | 2/2020 | Minakuchi | | B60G 17/0195 |
| 2022/0073041 A1 * | 3/2022 | Heidrich | | B60W 30/18145 |
| 2022/0119008 A1 * | 4/2022 | Suissa | | B60W 30/02 |
| 2022/0126878 A1 * | 4/2022 | Moustafa | | G08G 1/096741 |
| 2023/0311849 A1 * | 10/2023 | Raste | | B60W 10/04 |
| | | | | 701/22 |

* cited by examiner

DATA FUSION-CENTRIC METHOD AND SYSTEM FOR VEHICLE MOTION CONTROL

INTRODUCTION

The present disclosure relates to a data-fusion-centric method and system for vehicle motion control.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

The stability of vehicle motion control can be mainly determined by monitoring the stability indexes at three levels: body, axle, and wheels. At the body (center of gravity) level, the most common sources of information are the vehicle sideslip and phase-portraits related to body dynamic (e.g., sideslip-yaw rate phase portrait). However, the lateral velocity signal and the rear axle status signal may be unreliable. It is therefore useful to develop a method for vehicle motion control that takes into account the potential unreliability of the lateral velocity signal and the rear axle status signal.

SUMMARY

The present disclosure describes a data fusion-centric strategy for vehicle motion health monitoring and degradation mitigation that enhances robustness and controller reliability for the vehicle motion controller by combining different logics, criteria, and vehicle response information with a fusion strategy, which is independent of vehicle configuration. This is done by providing recommendations or adjustments to the motion controller when there are uncertainties such as road surface conditions or errors in input signals (measurements/estimations). In the present disclosure, the health monitoring and degradation mitigation methodology augments the vehicle motion control functionality with a data-fusion-centric approach. The methodology monitors the response of the vehicle at different levels (i.e., body, axle, and wheel) and takes a data fusion-centric approach to adaptively provide recommendations/adjustments to the vehicle motion controller. This approach results in higher reliability of the vehicle motion control system when dealing with various sources of uncertainties (e.g., uncertain lateral velocity estimation).

In an aspect of the present disclosure, a method for vehicle motion control includes receiving sensor data from a plurality of sensors of a vehicle and monitoring a vehicle response using the sensor data. The vehicle response is represented by a plurality of vehicle-response signals. The method further includes fusing the plurality of vehicle-response signals to obtain at least one fused signal. The method further includes determining whether to activate a vehicle stability control of the vehicle based on the fused signal and commanding the vehicle to activate the vehicle stability control in response to determining to activate the vehicle stability control of the vehicle based on the fused signal.

In an aspect of the present disclosure, monitoring the vehicle response includes monitoring a first rear tires sideslip instability index. The sensor data includes a lateral velocity of the vehicle. The first rear tires sideslip instability index is based on the lateral velocity of the vehicle.

In an aspect of the present disclosure, monitoring the vehicle response includes monitoring a second rear tires sideslip instability index. The sensor data includes a lateral vehicle acceleration of the vehicle. The second rear tires sideslip instability index is based on a lateral acceleration of the vehicle.

In an aspect of the present disclosure, monitoring the vehicle response includes monitoring a body stability index, a maximum stable yaw rate, a rear axle saturation index, and a rear wheel stability index.

In an aspect of the present disclosure, the method further includes determining whether to adjust a maximum stable yaw rate based on the fused signal. Fusing the plurality of vehicle-response signals includes determining a reliability of each of the plurality of vehicle-response signals. The vehicle-response signals are fused based on the reliability of each of the plurality of vehicle-response signals.

In an aspect of the present disclosure, the plurality of vehicle-response signals includes a first rear tires sideslip instability index, a second rear tires sideslip instability index, a body stability index, a maximum stable yaw rate adjustment, a rear axle saturation index, and a rear wheel stability index. The first rear tires sideslip instability index is based on a lateral velocity of the vehicle. The second rear tires sideslip instability index is based on a lateral acceleration of the vehicle. The method further includes fusing the plurality of vehicle-response signals includes determining that a reliability of at least one of the first rear tires sideslip instability index, the second rear tires sideslip instability index, and the body stability index is equal to or greater than a first reliability threshold. The method further includes determining to activate the vehicle stability control of the vehicle in response to determining that the reliability of at least one of the first rear tire sideslip index, the second rear tires sideslip instability index, and the body stability index is equal to or greater than a first reliability threshold.

The present disclosure also describes a vehicle. In an aspect of the present disclosure, the vehicle includes a plurality of sensors and a controller in communication with the plurality of sensors. The controller is programmed to receive sensor data from a plurality of sensors of a vehicle and monitor a vehicle response of the vehicle using the sensor data. The vehicle response is represented by a plurality of vehicle-response signals. The controller is further programmed to fuse the plurality of vehicle-response signals to obtain at least one fuse signal, determining whether to activate a vehicle stability control of the vehicle based on the fused signal, and command the vehicle to activate the vehicle stability control of the vehicle in response to determining to activate the vehicle stability control of the vehicle based on the fused signal.

In an aspect of the present disclosure, the controller is programmed to monitor a first rear tires sideslip instability index. The sensor data includes a lateral velocity data, and the first rear tires sideslip instability index is based on the lateral velocity data. The controller is programmed to monitor a second rear tires sideslip instability index. The sensor data includes a lateral vehicle acceleration data, and the second rear tires sideslip instability index is based on the lateral vehicle acceleration data. The controller is programmed to monitor a body stability index and a maximum stable yaw rate.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
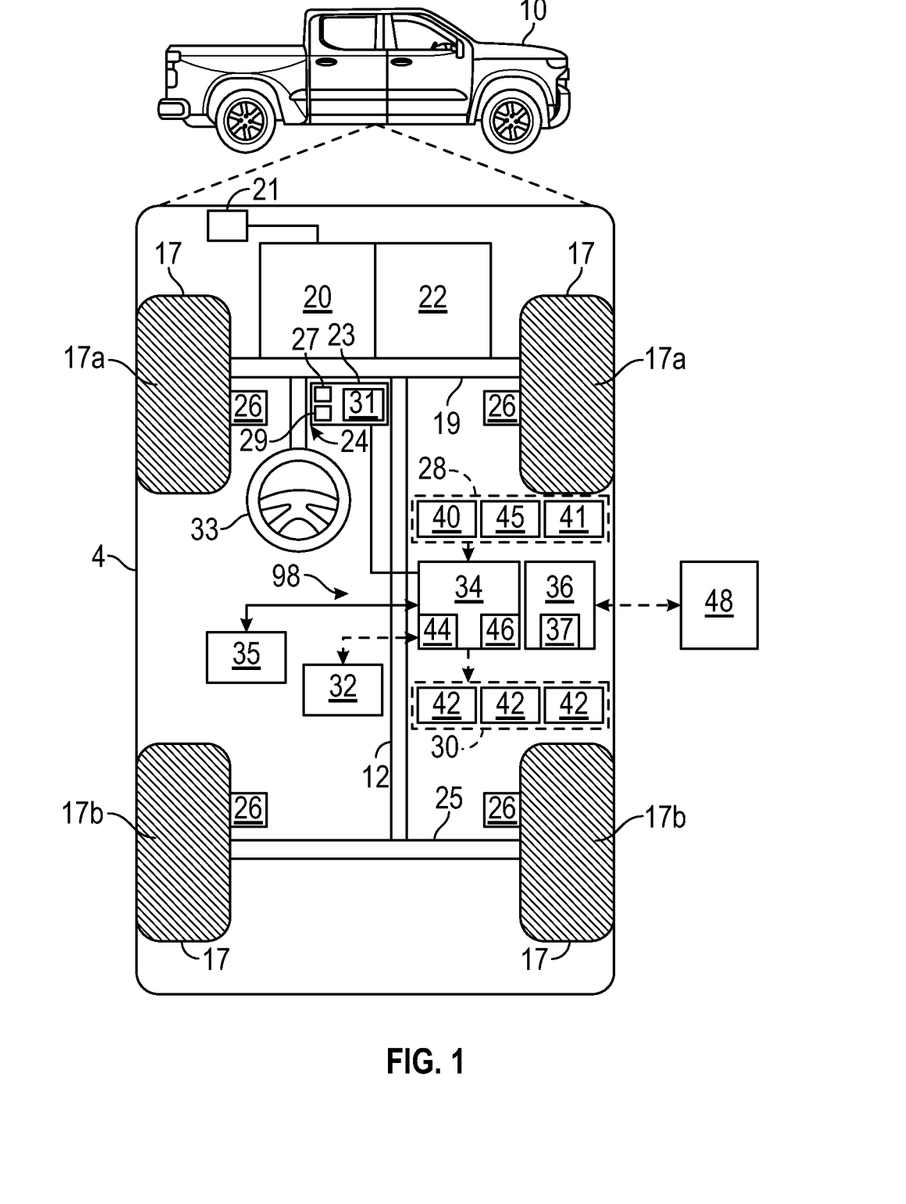
FIG. 1 is a block diagram depicting of a vehicle including a system for vehicle motion control.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle and a vehicle motion control system 98 is incorporated into the vehicle 10. The control system 98 may be referred to as the system. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The controller 34 may be referred to as the vehicle motion controller. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more yaw rate sensors, one or more slip angle sensors, one or more lateral acceleration sensors, one or more longitudinal acceleration sensors, one or more longitudinal velocity sensors, one or more lateral velocity sensors, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a sensor signal that is indicative of the sensed observable conditions of the exterior environment and/or the interior environment of the vehicle 10. The sensor signals include sensor data, such as the lateral velocity of the vehicle 10. Because the sensor system 28 provides sensor data to the controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the input signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be specifically programmed to execute a method 100 (FIG. 2) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the vehicle motion control system 98. The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user. Accordingly, the controller 34 is configured to receive inputs from the user via the user interface 23.

The communication system 36 is in communication with the controller 34 and is configured to wirelessly communicate information to and from other entities 48, such as but not limited to, other vehicles ("V2V" communication), infrastructure ("V2I" communication), remote systems at a remote call center (e.g., ON-STAR by GENERAL MOTORS) and/or personal devices. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
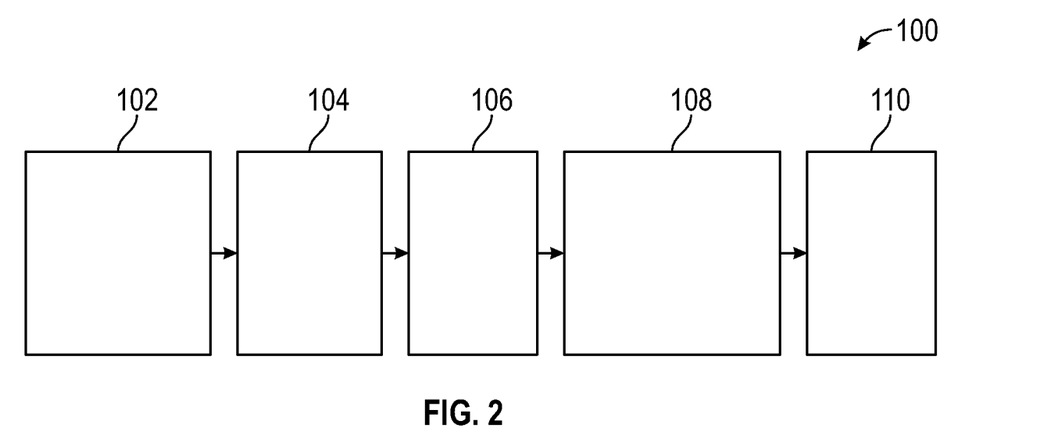
FIG. 2 is a flowchart of data-fusion-centric method for vehicle motion control.

FIG. 2 is a flowchart of a data-fusion-centric method 100 for vehicle motion control. The method 100 begins at block 102. At block 102, the sensors 40 measures and/or estimates different parameters in real time while the vehicle 10 is in motion. The measured and/or estimated parameters are referred to as sensor data. Then, the method 100 proceeds to block 104. At block 104, the controller 34 monitors and detects, in real time, the vehicle response of the vehicle 10 using the sensor data collected by the sensors 40. The monitored vehicle response may be represented by a plurality of vehicle-response signals. The vehicle-response signals may include a first rear tire sideslip index 50 (which is based on the lateral velocity of the vehicle 10), a second rear tire sideslip index 52 (which is based on the lateral acceleration of the vehicle 10), a body stability index 54, a maximum stable yaw rate adjustment 56, a rear axle saturation index 58, and a rear wheel stability index 60 (see FIG. 5). As a non-limiting example, the maximum stable yaw rate adjustment 56 may be determined using the methods described, in U.S. patent application Ser. No. 17/448,907, filed on Sep. 27, 2021. Next, the method 100 continues to block 106.

At block 106, the controller 34 performs data fusion and arbitration of the vehicle-response signals. As discussed below, the controller 34 arbitrates and fuses the vehicle-response signals based, at least in part, on the reliability and confidence level of each of the vehicle-response signals. The vehicle-response signals may have different reliabilities (i.e., confidence level), and the reliability of the vehicle-response signals may vary in real time. As a non-limiting example, the controller 34 may determine the confidence level and/or reliability of each of the vehicle-response signals using the method described in U.S. patent application Ser. No. 17/592,024, filed on Feb. 3, 2022, the entire disclosure of which is incorporated by reference herein. The weight given to the vehicle-response signals may also depend on the vehicle type, the tire conditions, the upcoming road geometry and, in the case of autonomous vehicles, the control command. It is useful to arbitrate and fuse the vehicle-response signals, because there may be conflict among the different the vehicle-response signals (e.g., body stability index 54). In the fusion process, the final recommendation should be based on the priority of the different vehicle-response signals. The vehicle-response signals may be viewed from different viewpoints, namely, a component or a dynamic coupling. The component referred to the wheel, the axle, and the body. The onset of the body instability may originate from a different component of the vehicle 10 and, if the vehicle component stability cannot be managed, it may adversely affect the body stability of the vehicle 10. Also, the dynamic couplings in the vehicle 10 may affect body stability, the body coupling refers to the coupling between plane dynamics (e.g., longitudinal, yaw, and lateral). The onset of the lateral instability may originate from different dynamics, and the coupling dynamics may adversely affect the lateral stability of the vehicle 10. The instability indexes (e.g., vehicle-response signals) is directly related to the instability of body dynamics. At block 106, the vehicle-response signals are fused to obtain a fuse signal. After executing block 106, the method 100 proceeds to block 108. At block 108, the controller 34 determines whether it is desirable to activate vehicle stability control of the vehicle 10 based on the fused signal. In other words, at block 108, the controller 34 determines whether to activate the vehicle stability control. Then, the method 100 proceeds to block 110. At block 110, the controller 34 activates or declines to activate the vehicle stability control based on the recommendation determined at block 106. When the vehicle stability control is activated, the controller 34 commands the brake system 26 to apply braking torque to the vehicle wheels 17 in a pulsed manner (such as in anti-lock braking systems) to prevent or stop slippage.

Figure 3:
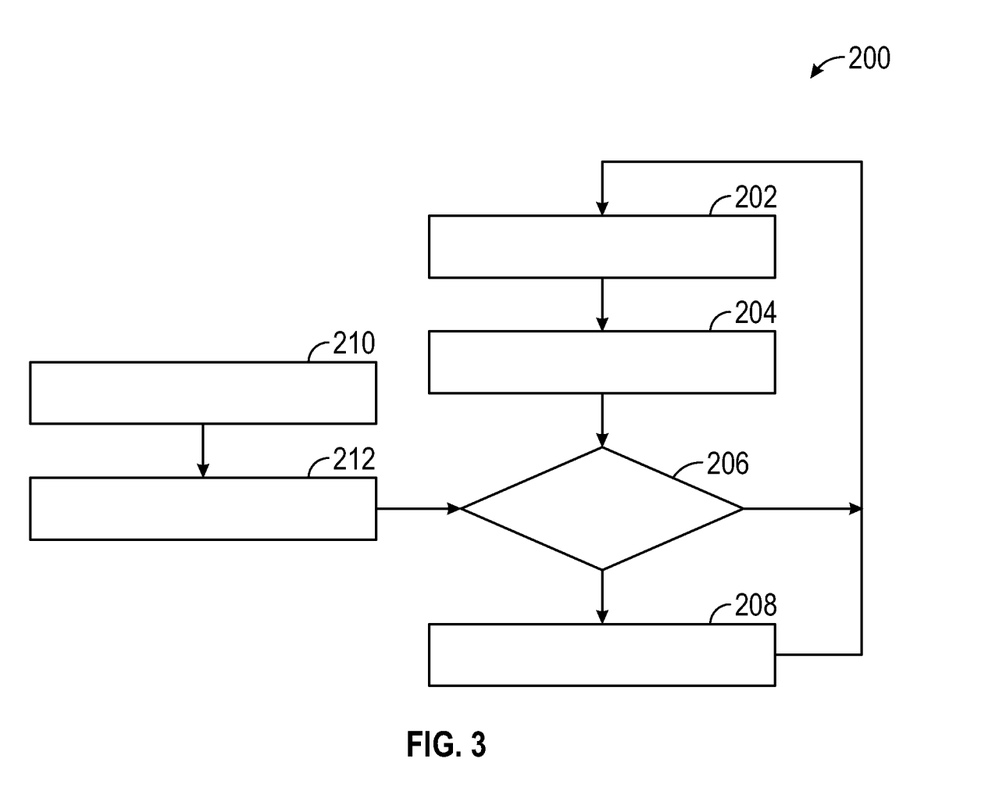
FIG. 3 is a flowchart of a process for monitoring rear tire slip angle of the vehicle of FIG. 1, wherein this process is part of the method of FIG. 2.

FIG. 3 is a flowchart of a process 200 for monitoring and determining the first rear tire sideslip index 50 (which is based on the lateral velocity of the vehicle 10). The process begins at block 202. At block 202, the controller 34 monitors the lateral velocity of the vehicle 10 using the sensor data. Then, the process 200 proceeds to block 204. At block 204, the controller 34 monitors the rear tire slip angle using the sensor data. Next, the process 200 continues to block 206. At block 206, the controller 34 compares the rear tire slip angle with a maximum stable rear slip angle to determine whether the rear tire slip angle is greater than the maximum stable rear slip angle. The maximum stable rear slip angle may be determined by testing the vehicle 10 and is considered a stability threshold. If the rear tire slip angle is greater than the maximum stable rear slip angle, then the controller 34 enables body stability control. If the rear tire slip angle is not greater than the maximum stable rear slip angle, then the process 200 returns to block 202. The process 200 further includes block 210 and block 212. At block 210, the controller 34 receives the vehicle-response signal (i.e., the first rear tire sideslip index 50). Then, the process 200 continues to block 212. At block 212, the controller 34 updates the maximum stable rear slip angle based on the vehicle response (i.e., the first rear tire sideslip index 50). The updated maximum stable rear slip angle is then used at block 206.

Figure 4:
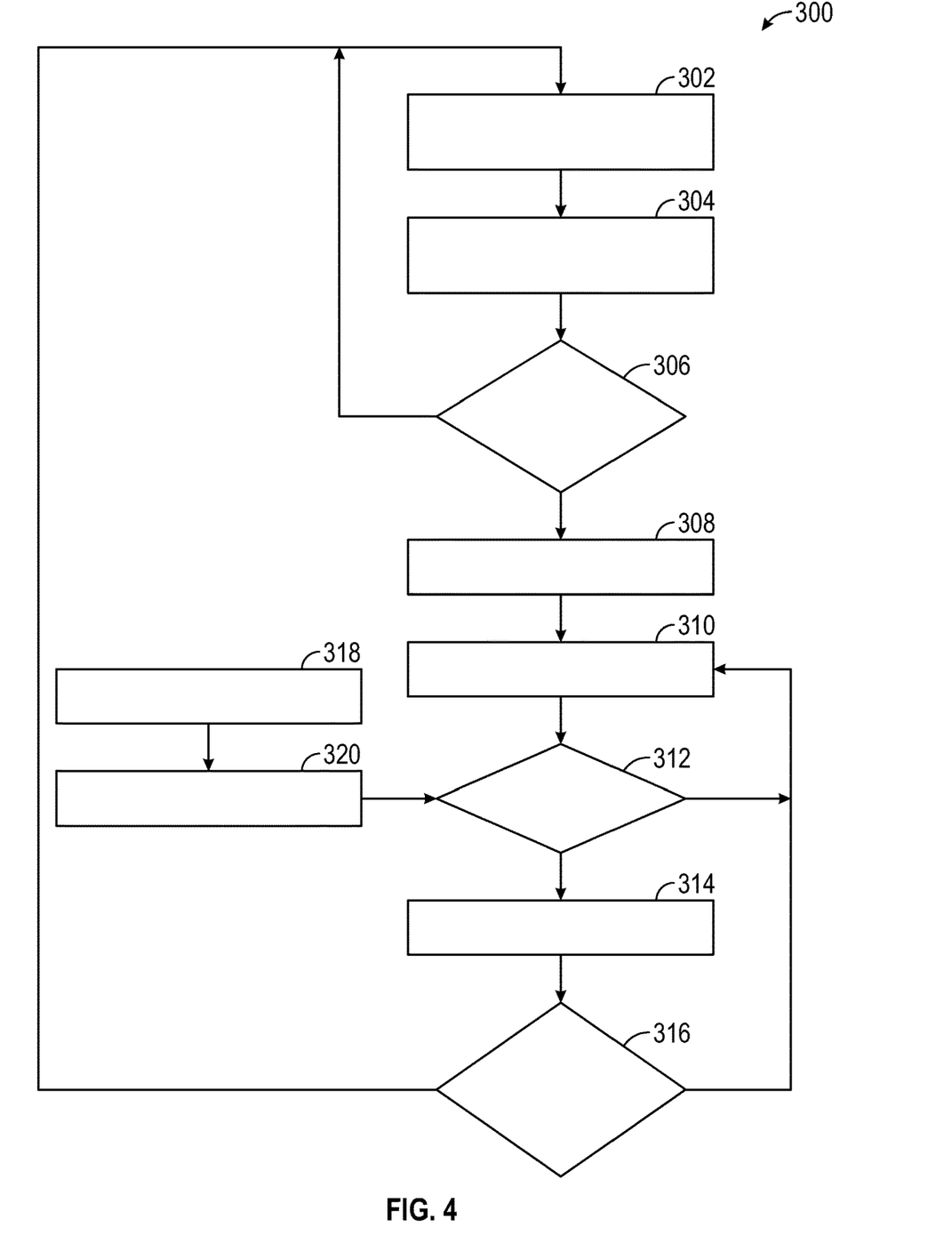
FIG. 4 is a flowchart of a process for monitoring a sideslip-yaw rate of the vehicle of FIG. 1, wherein this process is part of the method of FIG. 2.

FIG. 4 is a flowchart of a process 300 for monitoring and determining the second rear tires sideslip instability index (which is based on the lateral acceleration of the vehicle 10). The process 300 begins at block 302. At block 302, the controller 34 monitors the sideslip yaw-rate phase portrait of the vehicle 10 using the sensor data collected from the sensors 40. The sideslip yaw-rate phase portrait is graph of the sideslip yaw-rate versus the wheel angle of the vehicle 10. Then, the process 300 continues to block 304. At block 304, the controller 34 determines (e.g., calculates) the angle of trajectory of the vehicle 10. Then, the process 300 proceeds to block 306. At block 306, the controller 34 determines whether there is an early indication of instability based on the angle of trajectory of the vehicle 10 and the sideslip yaw-rate phase portrait of the vehicle 10. If there is no early indication of instability, then the process 300 returns to block 302. If there is an early indication of instability, then the process 400 continues to block 308. At block 308, the controller 34 starts to integrate the lateral acceleration of the vehicle 10. Next, the process 300 continues to block 310. At block 310, the controller 34 updates the difference in the rear tire slip angle within a predetermined time interval. Next, the process 300 continues to block 312. At block 312, the controller 34 compares the difference in rear tire slip angle within a predetermined time interval with a maximum difference in stable rear slip angle within a predetermined amount of time to determine whether the difference in rear tire slip angle within a predetermined time interval is greater than a maximum stable difference in rear slip angle within a predetermined amount of time. The maximum stable the difference in rear tire slip angle within a predetermined time interval with a maximum difference in stable rear slip angle within a predetermined amount of time to determine whether rear slip angle may be determined by testing the vehicle 10 and is considered a stability threshold. The Vy-dot integration is started when the early instability indication flag is raised, and it is reset when the vehicle yaw rate passes a certain threshold and its sign changes. In this time, the early indication of instability is no longer valid, and the algorithm is restarted from the beginning. Also, the Vy-dot integration is reset if it continues for more than a certain time interval. If the difference in rear tire slip angle within a predetermined time interval is not greater than the maximum stable difference in rear slip angle within a predetermined amount of time, then the process 300 returns to block 310. If the difference in rear tire slip angle within a predetermined time interval is greater than the maximum stable difference in rear slip angle within a predetermined amount of time, then the process 300 continues to block 314. At block 314, the controller 34 enables the body stability control of the vehicle 10. Then, the process 300 continues to block 316. At block 316, the controller 34 determines whether the early indication of instability is still valid. If the early indication of instability is no longer valid, then the process 300 returns to block 302. If the early indication of instability is still valid, then the process 300 returns to block 314. The process 300 further includes block 318 and block 318. At block 318, the controller 34 receives the vehicle-response signal (i.e., the second rear tire sideslip index 52). Then, the process 300 continues to block 320. At block 320, the controller 34 updates the maximum stable difference in rear slip angle within a predetermined time interval based on the vehicle response (i.e., the second rear tire sideslip index 52). The updated maximum stable difference in rear slip angle within a predetermined time interval is then used at block 312.

Figure 5:
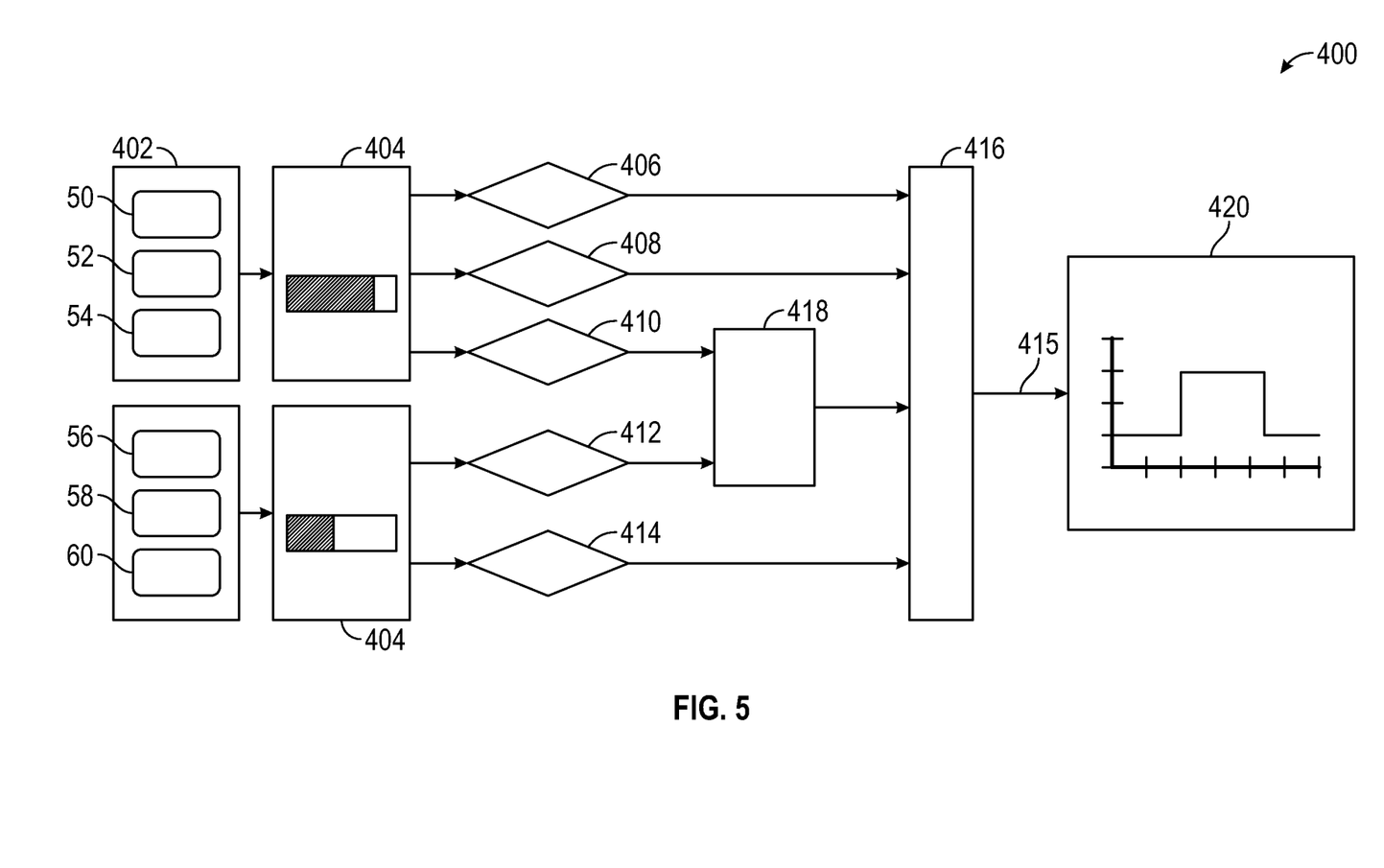
FIG. 5 is a flowchart of a process for fusing the vehicle-response signals to obtain a fused signal for activating lateral velocity control.

FIG. 5 is a flowchart of a process 400 for fusing the vehicle-response signals, which include a first rear tire sideslip index 50, a second rear tire sideslip index 52, a body stability index 54, a maximum stable yaw rate adjustment 56, a rear axle saturation index 58, and a rear wheel stability index 60. The process 400 begins at block 402. At block 402, the controller 34 monitors and detects, in real time, the vehicle response of the vehicle 10 using the sensor data collected by the sensors 40. The monitored vehicle response may be represented by a plurality of vehicle-response signals. The vehicle-response signals may include a first rear tire sideslip index 50 (which is based on the lateral velocity of the vehicle 10), a second rear tire sideslip index 52 (which is based on the lateral acceleration of the vehicle 10), a body stability index 54, a maximum stable yaw rate adjustment 56, a rear axle saturation index 58, and a rear wheel stability index 60 (see FIG. 5). As a non-limiting example, the controller 34 may determine the confidence level and/or reliability of each of the vehicle-response signals using the method described in U.S. patent application Ser. No. 17/592,024, filed on Feb. 3, 2022, the entire disclosure of which is incorporated by reference herein. Then, the process 400 continues to block 404.

At block 404, the controller 34 determines the reliability (i.e., confidence level) of each of the vehicle-response signals (i.e., the first rear tire sideslip index 50, the second rear tire sideslip index 52, the body stability index 54, the maximum stable yaw rate adjustment 56, a rear axle saturation index 58, and a rear wheel stability index 60). Then, the process 400 continues to block 406.

At block 406, the controller 34 determines whether the reliability of at least one of the first rear tire sideslip index 50, the second rear tire sideslip index 52, and the body stability index 54 is equal to or greater than a first reliability threshold (i.e., the high reliability threshold). If the reliability of at least one of the first rear tire sideslip index 50, the second rear tire sideslip index 52, and the body stability index 54 is equal to or greater than the first reliability threshold, then the controller 34 returns a true signal (i.e., one of the possible fused signals). Otherwise, the controller 34 returns a false signal. The true signal is indicative that the lateral velocity control (i.e., the vehicle stability control) should be activated.

The process 400 also includes block 408. At block 408, the controller 34 determines whether the reliability of at least two of the first rear tire sideslip index 50, the second rear tire sideslip index 52, and the body stability index 54 is equal to or greater than a second reliability threshold (i.e., the medium reliability threshold). The first reliability threshold is greater than the second reliability threshold. If the reliability of at least two of the first rear tire sideslip index 50, the second rear tire sideslip index 52, and the body stability index 54 is equal to or greater than the second reliability threshold, then the controller 34 returns a true signal (i.e., one of the possible fused signals). Otherwise, the controller 34 returns a false signal. The true signal is indicative that the lateral velocity control (i.e., the vehicle stability control) should be activated.

The process 400 also includes block 410. At block 410, the controller 34 determines whether the reliability of one of the first rear tire sideslip index 50, the second rear tire sideslip index 52, and the body stability index 54 is equal to or greater than a second reliability threshold (i.e., the medium reliability threshold). If the reliability of one of the first rear tire sideslip index 50, the second rear tire sideslip index 52, and the body stability index 54 is equal to or greater than the second reliability threshold, then the controller 34 returns a true signal (i.e., one of the possible fused signals). Otherwise, the controller 34 returns a false signal. The true signal is indicative that the lateral velocity control (i.e., the vehicle stability control) should be activated.

The process 400 also includes block 412. At block 412, the controller 34 determines whether the reliability of at least two of the maximum stable yaw rate adjustment 56, the rear axle saturation index 58, and the rear wheel stability index 60 is equal to or greater than the second reliability threshold (i.e., the medium reliability threshold). If the reliability of at least two of the maximum stable yaw rate adjustment 56, the rear axle saturation index 58, and the rear wheel stability index 60 is equal to or greater than the second reliability threshold, then the controller 34 returns a true signal (i.e., one of the possible fused signals). Otherwise, the controller 34 returns a false signal. The true signal is indicative that the lateral velocity control (i.e., the vehicle stability control) should be activated.

The process 400 also includes block 414. At block 414, the controller 34 determines whether the reliability of all of the maximum stable yaw rate adjustment 56, the rear axle saturation index 58, and the rear wheel stability index 60 is equal to or greater than the second reliability threshold (i.e., the medium reliability threshold). If the reliability of all of the maximum stable yaw rate adjustment 56, the rear axle saturation index 58, and the rear wheel stability index 60 is equal to or greater than the second reliability threshold, then the controller 34 returns a true signal (i.e., one of the possible fused signals). Otherwise, the controller 34 returns a false signal. The true signal is indicative that the lateral velocity control (i.e., the vehicle stability control) should be activated.

The process 400 also includes block 416. At block 416, the controller determines whether the signal originating from block 406, block 408, or block 414 is a true signal. If the signal stemming from block 406, block 408, or block 414 is a true signal, then the process 400 continues to block 420. At block 420, the controller 34 commands the vehicle 10 to activate the lateral velocity control. In doing so, the controller 34 commands the brake system 26 to apply brake pulses at consistent time intervals to minimize slippage. The brake pulses may have the same magnitude to minimize slippage.

The process 400 also includes block 418. At block 418, the controller 34 determines whether the signals originating from block 410 and block 412 are both true signals. If the signals originating from block 410 and block 412 are both true signals, then the process 400 continues to block 416. As discussed above, the controller 34 determines whether the signals stemming from block 406, block 408, block 418, or block 414 are true signals. If any of the signals stemming from block 406, block 408, block 418, or block 414 are true signals, then the controller 34 generates a fused signal 415 (i.e., a true signal) and the process 400 continues to block 420. At block 420, the controller 34 commands the vehicle 10 to activate the lateral velocity control.

Figure 6:
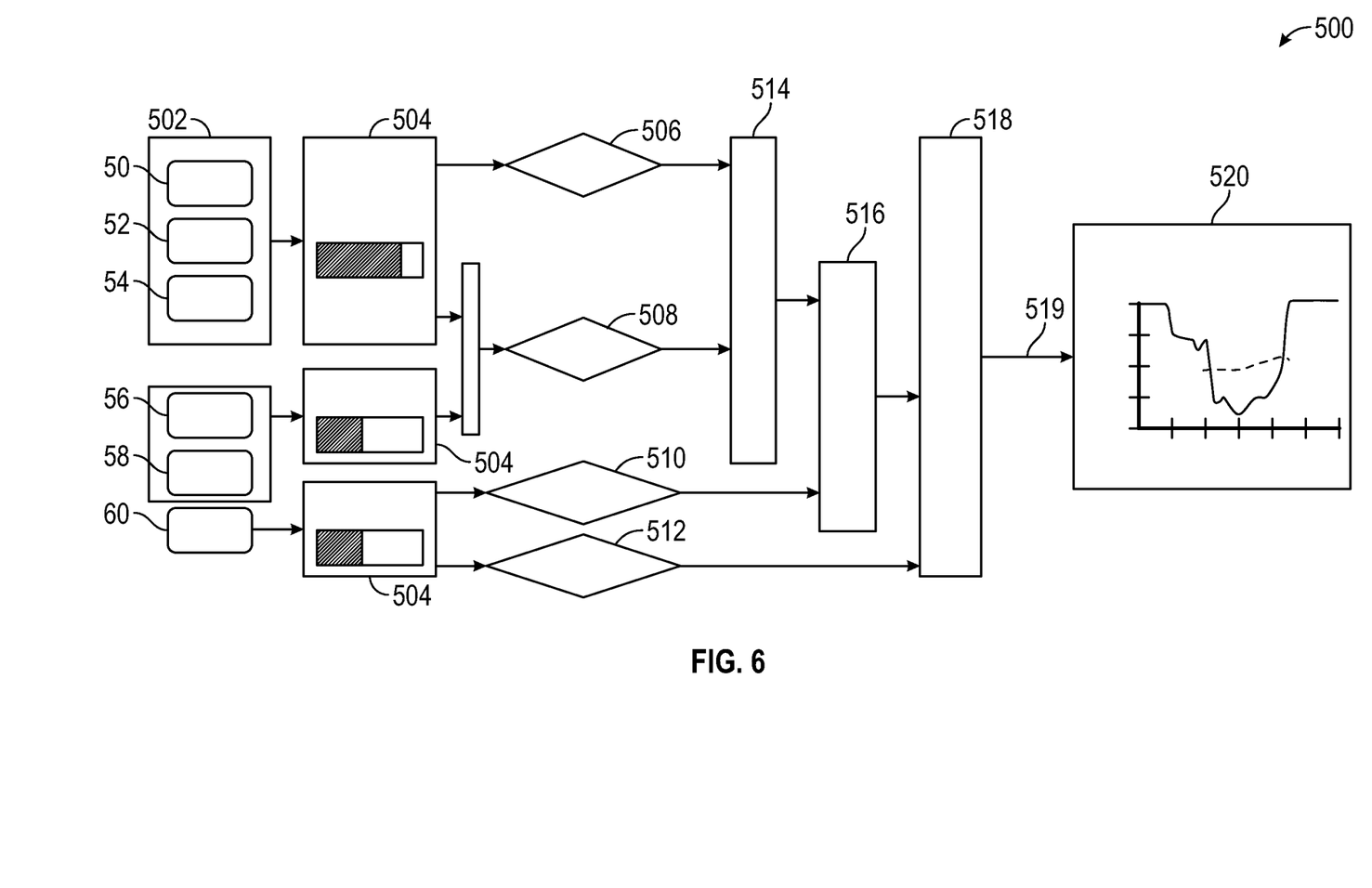
FIG. 6 is a flowchart of a process for fusing the vehicle-response signals to obtain a fused signal for adjusting maximum stable yaw rate.

FIG. 6 is a flowchart of a process 500 for fusing the vehicle-response signals to obtain a fused signal for adjusting maximum stable yaw. The process 500 begins at block 502. At block 502, the controller 34 monitors and detects, in real time, the vehicle response of the vehicle 10 using the sensor data collected by the sensors 40. The monitored vehicle response may be represented by a plurality of vehicle-response signals. The vehicle-response signals may include a first rear tire sideslip index 50 (which is based on the lateral velocity of the vehicle 10), a second rear tire sideslip index 52 (which is based on the lateral acceleration of the vehicle 10), a body stability index 54, a maximum stable yaw rate adjustment 56, a rear axle saturation index 58, and a rear wheel stability index 60 (see FIG. 5). Then, the process 500 continues to block 504.

At block 504, the controller 34 determines the reliability (i.e., confidence level) of each of the vehicle-response signals (i.e., the first rear tire sideslip index 50, the second rear tire sideslip index 52, the body stability index 54, the maximum stable yaw rate adjustment 56, a rear axle saturation index 58, and a rear wheel stability index 60). As a non-limiting example, the controller 34 may determine the confidence level and/or reliability of each of the vehicle-response signals using the method described in U.S. patent application Ser. No. 17/592,024, filed on Feb. 3, 2022, the entire disclosure of which is incorporated by reference herein. Then, the process 500 continues to block 506.

At block 506, the controller 34 determines whether the reliability of at least one of the first rear tire sideslip index 50, the second rear tire sideslip index 52, and the body stability index 54 is equal to or greater than the first reliability threshold (i.e., the high reliability threshold). If the reliability of at least one of the first rear tire sideslip index 50, the second rear tire sideslip index 52, and the body stability index 54 is equal to or greater than the first reliability threshold, then the controller 34 returns a true signal (i.e., one of the possible fused signals). Otherwise, the controller 34 returns a false signal. The true signal is indicative that the maximum stable yaw should be adjusted.

The process also includes block 508. At block 508, the controller 34 determines whether the reliability of at least two of the first rear tire sideslip index 50, the second rear tire sideslip index 52, the body stability index 54, the maximum stable yaw rate adjustment 56, and the rear axle saturation index 58 is equal to or greater than the second reliability threshold (i.e., the medium reliability threshold). If the reliability of at least two of the first rear tire sideslip index 50, the second rear tire sideslip index 52, the body stability index 54, the maximum stable yaw rate adjustment 56, and the rear axle saturation index 58 is equal to or greater than the second reliability threshold, then the controller 34 returns a true signal (i.e., one of the possible fused signals). Otherwise, the controller 34 returns a false signal. The true signal is indicative that the maximum stable yaw should be adjusted.

The process also includes block 510. At block 510, the controller 34 determines whether the reliability of rear wheel stability index 60 is equal to or greater than the second reliability threshold (i.e., the medium reliability threshold). If the reliability of rear wheel stability index 60 is equal to or greater than the second reliability threshold, then the controller 34 returns a true signal (i.e., one of the possible fused signals). Otherwise, the controller 34 returns a false signal. The true signal is indicative that the maximum stable yaw should be adjusted.

The process also includes block 512. At block 512, the controller 34 determines whether the reliability of rear wheel stability index 60 is equal to or greater than the first reliability threshold (i.e., the high reliability threshold). If the reliability of rear wheel stability index 60 is equal to or greater than the first reliability threshold, then the controller 34 returns a true signal (i.e., one of the possible fused signals). Otherwise, the controller 34 returns a false signal. The true signal is indicative that the maximum stable yaw should be adjusted.

The process 500 also includes block 514. At block 514, the controller determines whether the signal originating from block 506 or block 508 is a true signal. If the signal stemming from block 506 or block 508 is a true signal, then the controller 34 outputs a true signal. Then, the process 500 continues to block 516. At block 516, the controller 34 determines whether the signals stemming from block 514 and the block 510 are both true signals. If the signals stemming from block 514 and the block 510 are both true signals, then the process 500 continues to block 518. At block 518, the controller 34 determines whether the signal originating from block 516 or block 512 is a true signal. If the signal stemming from block 516 or block 512 is a true signal, then the controller 34 generates a fused signal 519 and the process proceeds to block 520. At block 520, the controller 34 adjusts maximum stable yaw rate.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for vehicle motion control, comprising:
receiving sensor data from a plurality of sensors of a vehicle;
monitoring a vehicle response of the vehicle using the sensor data, wherein the vehicle response is represented by a plurality of vehicle-response signals;
fusing the plurality of vehicle-response signals to obtain at least one fused signal;
determining whether to activate a vehicle stability control of the vehicle based on the at least one fused signal;
commanding the vehicle to activate the vehicle stability control in response to determining to activate the vehicle stability control of the vehicle based on the at least one fused signal; and
wherein the plurality of vehicle-response signals includes a first rear tires sideslip instability index, a second rear tires sideslip instability index, a body stability index, a maximum stable yaw rate adjustment, a rear axle saturation index, and a rear wheel stability index, the first rear tires sideslip instability index is based on a lateral velocity of the vehicle, the second rear tires sideslip instability index is based on a lateral vehicle acceleration of the vehicle, and fusing the plurality of vehicle-response signals includes determining that a reliability of at least one of the first rear tires sideslip instability index, the second rear tires sideslip instability index, and the body stability index is equal to or greater than a first reliability threshold and determining to activate the vehicle stability control of the vehicle in response to determining that the reliability of at least one of the first rear tires sideslip index, the second rear tires sideslip instability index, and the body stability index is equal to or greater than the first reliability threshold.

2. The method of claim 1, wherein monitoring the vehicle response includes monitoring the first rear tires sideslip instability index.

3. The method of claim 2, wherein the sensor data includes the lateral velocity of the vehicle.

4. The method of claim 3, wherein monitoring the vehicle response includes monitoring second rear tires sideslip instability index.

5. The method of claim 4, wherein the sensor data includes the lateral vehicle acceleration of the vehicle.

6. The method of claim 5, wherein monitoring the vehicle response includes monitoring the body stability index.

7. The method of claim 6, wherein monitoring the vehicle response includes monitoring the maximum stable yaw rate.

8. The method of claim 7, wherein monitoring the vehicle response includes monitoring rear wheel stability index.

9. The method of claim 8, further comprising determining whether to adjust a maximum stable yaw rate based on the at least one fused signal.

10. A vehicle, comprising:
a plurality of sensors;
a controller in communication with the plurality of sensors, wherein the controller is programmed to:
receive sensor data from the plurality of sensors;
monitor a vehicle response of the vehicle using the sensor data, wherein the vehicle response is represented by a plurality of vehicle-response signals;
fuse the plurality of vehicle-response signals to obtain at least one fuse signal;
determining whether to activate a vehicle stability control of the vehicle based on the at least one fused signal;
command the vehicle to activate the vehicle stability control of the vehicle in response to determining to activate the vehicle stability control of the vehicle based on the at least one fused signal; and
wherein the plurality of vehicle-response signals includes a first rear tires sideslip instability index, a second rear tires sideslip instability index, a body stability index, a maximum stable yaw rate adjustment, a rear axle saturation index, and a rear wheel stability index, the first rear tires sideslip instability index is based on a lateral velocity of the vehicle, the second rear tires sideslip instability index is based on a lateral vehicle acceleration of the vehicle, and fusing the plurality of vehicle-response signals includes determining that a reliability of at least one of the first rear tires sideslip instability index, the second rear tires sideslip instability index, and the body stability index is equal to or greater than a first reliability threshold and determining to activate the vehicle stability control of the vehicle in response to determining that the reliability of at least one of the first rear tires sideslip index, the second rear tires sideslip instability index, and the body stability index is equal to or greater than the first reliability threshold.

11. The vehicle of claim 10, wherein the controller is programmed to monitor the first rear tires sideslip instability index.

12. The vehicle of claim 11, wherein the sensor data includes the lateral velocity data.

13. The vehicle of claim 12, wherein the controller is programmed to monitor the second rear tires sideslip instability index.

14. The vehicle of claim 13, wherein the sensor data includes the lateral vehicle acceleration data.

15. The vehicle of claim 14, wherein the controller is programmed to monitor the body stability index.

16. The vehicle of claim 15, wherein the controller is programmed to monitor the maximum stable yaw rate.

* * * * *